United States Patent [19]

Remer

[11] 4,235,937

[45] Nov. 25, 1980

[54] BLAND PROTEIN PRODUCT AND PROCESS

[75] Inventor: Robert K. Remer, Evanston, Ill.

[73] Assignee: Hull-Smith Chemicals, Inc., Oak Brook, Ill.

[21] Appl. No.: 933,173

[22] Filed: Aug. 14, 1978

[51] Int. Cl.³ .................. A23C 21/00; A23C 21/08
[52] U.S. Cl. .................... 426/534; 426/486;
    426/488; 426/565; 426/575; 426/576; 426/580;
    426/582; 426/583; 426/584; 426/590; 426/598;
    426/602; 426/657
[58] Field of Search ........... 426/89, 100, 101, 103,
    426/322, 330.2, 334, 575, 576, 580, 583, 584,
    586, 590, 598, 656, 657, 486, 487, 488, 491, 519,
    520, 522, 802, 582, 534, 565; 260/112 R, 122

[56] References Cited

U.S. PATENT DOCUMENTS

| | | | |
|---|---|---|---|
| 3,252,961 | 5/1966 | Rodgers et al. | 426/656 |
| 3,378,375 | 4/1968 | Little | 426/583 X |
| 3,560,219 | 2/1971 | Attebery | 426/583 |
| 3,637,643 | 1/1972 | Wingerd | 426/583 |
| 3,728,128 | 4/1973 | Luksas | 426/583 X |
| 3,840,671 | 10/1974 | Kim et al. | 426/802 X |
| 3,842,062 | 10/1974 | Eastman | 426/583 |
| 3,852,480 | 12/1974 | Williams | 426/656 X |
| 3,873,751 | 3/1975 | Arndt | 426/583 |
| 4,036,996 | 7/1977 | Chandler et al. | 426/656 X |
| 4,036,999 | 7/1977 | Grindstaff | 426/583 X |

OTHER PUBLICATIONS

Webb et al, *Byproducts from Milk*, 1970, pp. 292–294 & 317.
"Whey Products Conference/1974", USDA, ERRC Publication No. 3396, 4–1975.
"Whey Products Conference/1976", USDA, AR-S-NE-81,4-1977, Atlantic City, N.J.

*Primary Examiner*—Arthur L. Corbin
*Attorney, Agent, or Firm*—Lockwood, Dewey, Alex & Cummings

[57] ABSTRACT

During blending of whey in the presence of heat there is added a metal gluconate solution, to give the whey a bland odor and taste, as well as a colloid enhancer component to impart a colloidal type condition to the whey. Thereafter, a floc initiator may be added to separate the whey into a solids fraction floc and a liquid fraction. Also disclosed is a gelatin containing a bland and colloidal type whey, a gel inducer and a bland soy protein liquid.

23 Claims, No Drawings

BLAND PROTEIN PRODUCT AND PROCESS

BACKGROUND AND DESCRIPTION OF THE INVENTION

The present invention relates generally to improvements in processing dairy whey and other protein sources for rendering them useful as a palatable extender, additive, product base, or protein supplement for a variety of food products. In its preferred form, the invention involves the maintenance of the whey by-product from a cheese-making operation at or near the temperature at which the whey is produced and power blending this hot by-product with a variety of substances in order to form a colloidal suspension including protein and naturally occurring sugars while eliminating characteristic whey odor and taste to form a useful and valuable colloidal protein source, while also simultaneously imparting a colloidal type of physical condition thereto for easy and rapid separation into a proteinaceous floc having a relatively high solids content and a proteinaceous liquid, both the floc and the liquid also being palatable and useful in connection with food products, including the formation of a gelatin material that can be set at room temperature.

Over the years, numerous and varied approaches have been taken in an effort to transform large volumes of potentially valuable, whey cheese-making by-products into products suitable for use within large-scale food processing operations. Whey by-products that fall within the general classification of sweet wheys are typically more palatable in the state in which they are formed and are generally more susceptible to treatment than are acid wheys. Sweet wheys are produced by the addition of proteolytic enzymes such as rennin and/or pepsin to milk in order to coagulate casein therewithin and form a cheese curd which is subsequently separated from the sweet whey thus produced as the uncoagulated, highly liquid whey by-product having a solids content of about 6.5 weight percent and which is all too often discarded as a waste product, sometimes to the detriment of the environment. Acid whey, which also has a solids content of about 6.5 weight percent, is formed during the production of products such as cottage cheese, made upon the coagulation of milk by the activity of a mineral acid or, more usually, by lactic acid produced bacteriologically.

Examples of the variety of attempts to transform large volumes of whey into products suitable for use within food processing are represented by Attebery U.S. Pat. No. 3,560,219, Wingerd U.S. Pat. No. 3,637,643, Eastman U.S. Pat. No. 3,842,062, and Grindstaff U.S. Pat. No. 4,036,999. Representative of literature in this area includes: "Whey Products Conference/1974", Eastern Regional Research Center, U.S. Department of Agriculture, ERRC Publication No. 3996, April, 1975; and "Whey Products Conference/1976", Atlantic City, New Jersey, Eastern Regional Research Center, U.S. Department of Agriculture, ARS-NE-81, April, 1977. These various publications report upon a variety of previously known approaches taken in attempting to exploit the potential of whey as a source of high quality protein including virtually all of the amino acids and as a source of the minerals that are valuable to the maintenance of human health. A frequently sought after objective is the recovery of whey protein, as well as other protein such as soy protein, without its denaturation so that it can be readily combined with other food or feed components.

Raw whey itself has several properties that make it undesirable for use in food products, especially those for human consumption. Raw whey has a very pungent and generally undesirable odor and has taste characteristics that are equally unappealing. Raw whey also has a relatively high lactose to glucose ratio; typically raw whey contains no glucose, lactose being the only sweetness enhancer present. Lactose is not the most desirable form of sugar for most uses, it being much less sweet than, for example, glucose or galactose, both of which are known to be formed upon the hydrolysis of lactose. Known whey lactose hydrolysis methods have generally been restricted to either those using strong acid or those using enzymes of the lactose type. Acid hydrolysis typically requires very stringent conditions and results in significant denaturation of whey protein, making such an approach undesirable for producing valuable food products from whey. Enzyme hydrolysis has the serious disadvantage of requiring excessive lengths of time to perform the desired hydrolysis while requiring exacting biological conditions.

Numerous procedures are also available for the recovery of vegetable protein such as that found in soy beans or glutens. Most commercial sources of soy protein are extracted with hexane or other hydrophobic materials which impart hydrophobic tendencies to the extracted protein, thereby reducing the scope of usefulness for such proteins. Denaturation of vegetable protein while extracting it is also a significant problem.

Even were whey or vegetable protein to be treated successfully while avoiding protein denaturation, it typically has not heretofore been possible to readily separate solid fractions from liquid fractions. For example, in known whey treatment processes, when it is desired to recover whey solids or dewater the treated whey, difficult and usually less than adequate separation techniques must be employed, such as sophisticated high-speed centrifugation, molecular sieve operations such as those using ultrafiltration membranes, dialysis, electrodialysis, ion exchange resins, or other generally expensive procedures.

By the present invention, acid whey or sweet whey is rendered bland both from the point of view of odor and taste, and is made more biologically stable, is improved in sweetness, and is reduced in lactose to glucose ratio, valuable results also being brought about for other protein sources, with all of these desirable properties being accomplished simultaneously while avoiding denaturation of the valuable protein and while placing the processed material into a form in which it can be readily separable into a solids fraction and a liquids fraction. Basically, the protein source is power blended in the presence of a component including a blandness imparting agent and a colloid enhancer.

It is a general object of the present invention to provide an improved protein product and process for forming it.

Another object of this invention is to provide an improved bland protein product from a pungent and often discarded protein source in order to prepare foods or feeds.

Another object of the present invention is to provide an improved protein product having a colloidal type of physical condition suitable for use in certain food applications while at the same time being ripe for further treatment in order to separate off a valuable proteinaceous floc from a valuable proteinaceous liquid, both being suitable for food uses.

Another object of this invention is an improved process and product produced thereby which avoids significant denaturation of protein from natural sources such as whey and vegetation.

Another object of this invention is an improved process for transforming cheese-making whey by-products into products suitable for use as palatable food extenders, additives, product bases or protein supplements.

Another object of the present invention is to provide an improved whey-based product having improved sweetness, a reduced lactose to glucose ratio, and enhanced biological stability, and a minimized manifestation of lactic acid.

Another object of the present invention is a substitute gelatin product and process of preparing same which incorporates a whey protein source.

Another object of this invention is to provide an improved product and process for washing whey from freshly produced cheese products.

These and other objects of this invention will be apparent from the following detailed description thereof.

In its basic embodiment, the present invention covers a process for treating protein sources with certain components, the use of those components for such purpose, and the products produced thereby. For convenience and for ease of reading, the descriptive portions of this specification discuss cheese-making whey by-products as the source of protein, but the general principles of this invention are to be understood to be applicable to other protein sources, particularly vegetable protein sources, especially soy beans, or to animal sources other than whey.

Whey is power blended in the presence of a blandness imparting agent and a colloid enhancer to form a collodial type of system. Such a system is then readily separable into a solids fraction or floc and a liquids fraction by the addition of a floc initiator. Other ingredients, for example a pH adjuster, an oxidizing agent, an enzyme, such as lactose, a colorant, a flavoring, a natural moss, or other type of ingredient may be added in order to impart certain properties to the formulations.

An important feature of this invention is the use of whey that is fresh as possible and that has not been permitted to cool down to a significant extent from the temperature at which the whey is generated in a cheese-making process. Less than completely fresh whey can be adequately processed in accordance with this invention provided its temperature is maintained as high as possible and preferably such that it does not drop below 90° F., more preferably 100° F. Usually, the more efficient the temperature maintenance and the shorter the time lapse between generation of the raw whey and its treatment in accordance with this process, the more valuable and more advantageous is the final product of this invention.

Blandness imparting agents in accordance with this invention are especially useful for masking or blanding the unpleasant odor and taste properties of natural protein sources, especially whey. They are also especially valuable within systems that exhibit colloidal tendencies. Metal gluconates are particularly useful in this regard, especially when provided in solution and in combination with an aminocarboxy acid, preferably aminoacetic acid or glycine. In an especially preferred embodiment, the blandness imparting agent is an aqueous solution containing a 1:1 molar combination of metal gluconate and glycine. Acceptable metal gluconates include iron or ferrous gluconate and copper gluconate. In the preferred embodiment, the 1:1 molar combined solution of metal gluconate and glycine is added in a total quantity of between about 5 ml to about 60 ml for each gallon (3.785 liters) of raw whey.

Colloidal enhancers in accordance with this invention belong to the general class of cellulose derivatives, particularly those of the cellulose glycolate type, most preferably a carboxyalkyl cellulose material, including alkali metal carboxymethyl cellulose compounds. The preferred colloidal enhancer is sodium carboxymethyl cellulose, also known as CMC. Useful in this regard are other synthetic or natural gums which have somewhat high viscosities and exhibit general protective colloid properties such as locust bean gum, guar gum, karaya gum, gum traq, or mixtures thereof. Quantities of the colloid enhancer may generally range between about 2 and about 40 grams for each gallon (3.785 liters) of liquid. When the colloid enhancer is subjected to power blending conditions in the presence of raw whey, especially raw whey already having the blandness imparting agent and a metal hydroxide blended therewith, it imparts to the whey a colloidal-type physical condition which renders the whey particularly susceptible to the operation of the floc initiator of this invention when it is included in order to form a solids fraction and a liquids fraction.

When floc initiator is to be used, it is preferably added after the blandness imparting agent, a metal hydroxide if used, and the colloid enhancer are all added, whereupon the whey product will, without any further treatment whatsoever, separate into the solids fraction and the liquids fraction, the solids fraction being in the form of a very thick floc from which the liquids fraction can be readily decanted by a separatory funnel apparatus, the volume of the solids fraction or floc being approximately the same as the volume of the liquids fraction. The floc initiator generally belongs to the class of alkali metal silicates, most advantageously provided in the form of highly alkaline sodium or potassium solutions, especially sodium silicate solutions which typically contain approximately 40% $Na_2Si_3O_7$ and which can be represented by the formulation $(SiO_2/Na_2O) = 3.22$. Floc initiator solution may be added in quantities between about 5 and about 60 ml for each gallon (3.785 liters) of raw whey, preferably between about 10 ml and about 40 ml.

An optional ingredient that can be added in accordance with this invention is a source of divalent metal ions, preferably calcium ions in the form of calcium hydroxide so as to serve to raise the pH of the raw whey while adding calcium ions thereto. From about 1 to about 15 grams of calcium hydroxide powder may be added to each gallon (3.785 liters) of raw whey, depending generally upon the pH of the raw whey as modified by the other materials added to the system. Preferably, the pH of the system after addition of the floc initiator will be at or near the isoelectric point of the whey proteins, which is typically at a slightly acidic pH, the isoelectric point of a typical cottage cheese whey protein makeup being between about 6.4 to 6.6. In some instances, such as when the protein source being treated is a sweet whey, the pH may have to be lowered somewhat through the use of an acid, preferably a weak, edible acid such as citric acid. In general, the quantity of any pH adjuster will be dictated by the amount needed to approximate the isoelectric point of the total system.

In some instances, it may be desirable to add an oxygen source with a view toward further enhancing the bacteriological preservation properties of the system above those provided by the blandness imparting agent. Ingredients such as hydrogen peroxide or sources of ozone bubbled into the system will generally improve the bacteriological stability thereof. Very small concentrations of these oxygen sources are adequate, for example between about 2 and about 15 ml of hydrogen peroxide can be added.

Although this invention is not to be limited by any theory of reaction mechanism or ionic equilibria analysis, the following explanations are offered. Blandness imparting agents such as the iron and copper gluconates in combination with glycine which assists in keeping the metal ions in solution, when subjected to power blending that develops shear forces, and particularly when combined with the addition of calcium ions into the system as a next step, helps to develop the colloidal nature of the protein material in order to keep the various particles and ions well dispersed within the system in order to counteract whey protein membranes and combine with each other readily to effect the automatic decanting feature of this invention. It has been found, consistent with these explanations, that superior results are achieved when the blandness imparting agent is added first, optionally followed by calcium hydroxide, after which the colloidal enhancer is added, all while the power blending is being accomplished, after which adding the floc initiator will bring about floc formation within a matter of minutes or less.

It has been observed that protein denaturation is not significant and the ratio of lactose to glucose is decreased when the present invention is practiced. Typically, raw whey contains only lactose or milk sugar, which has a chemical structure including glucose and galactose molecules, both of which have greater sweetening attributes than lactose. During the high-shear dispersion of the materials in accordance with this invention, the overall sweetness of the product is enhanced significantly, and the ratio of lactose to glucose is found to decrease over that of the untreated raw product. In connection with enzyme lactose hydrolysis techniques, whey treated in accordance with this invention can be subjected to lactose conversion by using significantly reduced quantities of enzymes such as lactase.

It is further believed that when the floc initiator component is utilized, the colloidal enhancer moves substantially entirely into the liquids fraction, rather than into the floc or solids fraction, which enhances the usefulness of the liquids fraction as an important gelatin substitute. Upon the addition of a natural moss or a gum, it is believed to combine with the colloidal enhancer within the liquids fraction in order to form a high-protein gelatin type product which can set or gel under ambient temperature conditions above the refrigeration temperatures normally associated with the setting of gelatin. Generally, this gelatin formation occurs upon adding from about 10 to about 50 grams of a natural moss to a quantity of about 2,000 mls of the liquids fraction.

A typical processing sequence for transforming whey into palatable foods or food ingredients begins by maintaining the temperature of the whey to near but not significantly above the temperature at which it is discharged during a commercial cheese-making operation. This discharge temperature is below the temperature at which whey protein will denature and generally ranges between about 120° and 125°. The temperature should not be allowed to drop below about 90° F. during any storage time, preferably being maintained well above 100° F. Additionally, the effectiveness of this process can be greatly diminished due to what is believed to be breakdown of proteins within the whey environment if the temperature maintenance is allowed to continue for too long a period of time, for example in excess of eight hours.

Fresh, warm whey is then subjected to power blending conditions or other suitable means which will impart shear forces to the whey, preferably by passing the materials between rotating knife edges and by forming a vortex-like flow path within the power blender. These power blending conditions should be accompanied by steady heating if the whey is not warm enough. The temperature of the whey when being treated should generally be above 125° F. and below the denaturing temperatures for the proteins present, preferably between about 130° F. and 135° F. Generally, the components added in accordance with this invention are blended in while the fresh whey is maintained at this temperature, with the floc initiator being added after the maximum temperature is reached and the blending being terminated when the temperature of the whey being treated reaches at least 125° F.

Food products made in accordance with this invention can utilize the unseparated colloidal dispersion, the separated solids fraction, or the separated liquids fraction. The usefulness of the unseparated dispersion can be enhanced by homogenization either before or after incorporation into a food product such as flavored drinks, unflavored protein drinks of the soya milk type, or simulated whole milk dairy drinks using the whey material as an extender for skim milk. The separated liquids fraction, which may have been self-decanted from the solids fraction floc, may also be used in preparing these and other types of high moisture content products. Separated solids fraction, which may have been formed by automatic decanting from the liquids fraction is more advantageously used within lower moisture content products such as ice cream, yogurt and creamy dressings such as those of the cottage cheese type. When appropriate to do so, any of these food products may be pasteurized in accordance with customary procedures.

A particularly advantageous use of the liquids fraction is in making a substitute gelatin that will set at room temperature or under refrigeration. A natural moss or gum, such as a sea moss, is incorporated into the liquids fraction, preferably under power blending or shear conditions. Gelatins made in this manner, however, tend to have a cloudy white or beige appearance, which is undesirable for adding simple coloring agents thereto. A clear product combines a soya-based protein extract liquid prepared according to the general principles of this invention with the separated whey liquids fraction.

More particularly, in preparing such a soya-whey gelatin product, a source of isolated protein, preferably one that had been extracted in a manner that does not form any significant residue of hydrophobic chemicals, is dispersed within distilled water, preferably under power blending or shear conditions according to this invention. In order to control the characteristic odor and taste of soy protein, thought to be caused by the presence of tannin, the addition of the blandness imparting agent in accordance with this invention is made, which may be followed by the addition of a pH adjuster. Blending is continued, and a dissolved enzyme such as papain is added in a quantity of between about 1 and 5 grams of enzyme per 2500 mls of water base, followed by the addition of between about 1 and about 10 ml of an emulsion having approximately equal volume amounts of carbon disulfide and a food grade emulsifier. At this stage, immediate clarification of the material begins, and more complete clearing develops upon blending at ambient temperature for approximately one hour and standing for a few hours thereafter. When this product is combined with the liquids fraction from the decanted whey product, preferably again under power blending or shear conditions, a clear blend including undenatured protein is obtained. When a natural moss or gum is power blended thereinto, a material is formed, which, when allowed to stand at ambient temperature, will set into a clear gelatin mass having acceptable thermomeltability. Thereafter, the set product can be dried by following customary procedures, including passing through a votator type of blender or ricer under temperatures on the order of about 40° to about 45° F. followed by heat drying, usually under convexion conditions. It is believed that it might be advantageous to lower the pH of the blended whey-soya mixture and filter the mixture by electrophoresis or the like, and then again raise the pH to near the isoelectric point of the protein prior to adding the natural gum or moss in forming this gelatin product.

Blandness imparting agents as specified herein can also be useful within cheese making operations as a product for assisting in the final separation of whey from cheese during the production thereof. Approximately 10 to 20 ppm of the blandness imparting agents of this invention added to the final cheese rinsing water will improve this stage of cheese making.

The following specific examples will more precisely illustrate the invention and teach the procedures presently preferred for practicing the same, as well as the improvements and advantages realized whereby and the products prepared in accordance therewith.

EXAMPLE 1

One gallon of cottage cheese or acid whey having a pH of 4.6 and a temperature of 115° F. was placed into a stainless steel beaker having a capacity of approximately two gallons, the beaker being fitted with a controllable heat supply in the form of an electric hotplate, together with a power blender having high rpm capacity and having a blending blade especially designed for imparting high shear properties to the materials being power blended. Blending and heating were commenced, and 20 ml. of a 1:1 molar blend of 472 mg. of ferrous gluconate and 75 mg. of glycine dissolved within 4720 cc. of water were added, as were 20 ml. of a 1:1 molar mixture of 472 mg. of copper gluconate and 75 mg. of glycine dissolved within 4720 cc. of water. Added next while heating and blending continued, were 40 ml. of sodium silicate solution (identifiable as $(SiO_2/Na_2O)=3.22$, Be. 41.0°), 5 ml. of hydrogen peroxide, and 10 gm of high viscosity sodium carboxymethylcellulose, after which were added 3 gm. of calcium hydroxide dissolved within 40 ml. of decanted whey water. Heating and blending were stopped when the temperature reached 130° F. The thus treated whey was then removed from the power blender and was allowed to sit under ambient temperature and pressure within a transparent bottle having a spigot. A whey floc formed, and the liquids portion of the separated whey was decanted from the solids portion by passing it through the spigot in the bottom of the transparent bottle.

Both the liquids portion and the floc portion were analyzed on an Enzymax flowing-stream lactose/glucose analyzer manufactured by Leeds & Northrup Co. The liquids fraction at 68° F. and a pH of 6.3, was found to have a lactose content of 4.4 weight percent and a glucose content of 0.9 weight percent, while the floc at 68° F. and a pH of 6.4 was analyzed to have a lactose content of 4.2 weight percent and a glucose content of 0.7 weight percent. Untreated raw cottage cheese whey analyzes as having a glucose content of less than 0.1 weight percent.

EXAMPLE 2

A test substantially identical with that of Example 1 was proceeded with except that only 30 ml. of sodium silicate solution, 15 gm. of high viscosity sodium carboxymethylcellulose and 4 gm. of calcium hydroxide dissolved in 40 ml. of decanted whey water were added while the temperature was raised to 132° F.

The liquids fraction analyzed (at 67° F. and a pH of 6.2) as having 4.4 weight percent lactose and 0.8 weight percent glucose, while the floc portion analyzed (at 68° F. and a pH of 6.2) to have a lactose content of 4.2 and a glucose content of 0.5. This formulation was also found to be amenable to pasteurization at about 162° F.

EXAMPLE 3

In this example, runs were made which indicate that optimum decanting properties are achieved when a calcium hydroxide pH adjusting agent is added after the blandness imparting agent and before the colloid enhancer.

Within the apparatus of Example 1, the following materials were added in this order: 1 gallon of cottage cheese whey at 110° F. and pH 4.4; 20 ml. each of the iron gluconate and the copper gluconate solutions detailed in Example 1; 15 gm. of the carboxymethylcellulose; 10 ml. of hydrogen peroxide (30% stabilized); 40 ml. of the sodium silicate solution; and 5 gm. of calcium hydroxide, the heating being stopped at 132° F. Despite the presence of 40 ml. of the sodium silicate solution floc initiator, approximately 24 hours were required for this formulation to fully decant. Only slightly better decanting was observed when the calcium hydroxide content was increased to 7.5 gm., with the silicate solution remaining at 40 ml.

Decanting was observed within about 1 minute after passage into the spigoted, transparent bottle when the order of addition was changed to be as follows: 1 gallon of cottage cheese whey at a pH of 4.4 and a temperature of 110° F.; 20 ml. of each of the iron and copper gluconate solutions; 8.5 gm of calcium hydroxide; 15 gm. of the carboxymethylcellulose; only 30 ml. of the sodium silicate solution; and 10 ml. of hydrogen peroxide, heating again being to 132° F.

EXAMPLE 4

The temperature of a supply of swiss cheese whey was maintained no lower than 90° F., and one gallon thereof was inserted into the apparatus of Example 1, followed by 20 ml. of the iron gluconate and glycine solution of Example 1; 20 ml. of the copper gluconate and glycine solution of Example 1; 15 gms. of carboxymethylcellulose; 1 gram of calcium hydroxide; 30 ml. of sodium silicate solution; 5 ml. of hydrogen peroxide; and 10 gm. citric acid. Heating was stopped when a temperature of 130° F. was reached. Excellent automatic decanting off of the floc solids was observed, and the product exhibited no odor or characteristic whey taste.

EXAMPLE 5

Another supply of swiss cheese whey was maintained at a temperature no lower than about 122° F., after which 20 ml. of iron gluconate and glycine 1:1 molar solution was added, followed by 10 ml. of hydrogen peroxide solution; 15 gm. of sodium carboxymethylcellulose; 30 ml. of sodium silicate solution; and 10 gm. of citric acid. Heating was discontinued at 140° F. Satisfactory decanting was observed, and the product had a very sweet taste.

EXAMPLE 6

One gallon of cheddar cheese whey having been maintained at a temperature no lower than 90° F. was treated within the apparatus of Example 1 with 20 ml. of the sodium silicate solution and 10 gm. of carboxymethylcellulose, no blandness imparting agent being added, after which the heating was continued until a temperature of 130° F. was reached. Upon transferring into the transparent separatory bottle, the formulation decanted instantly, although a very slight whey odor and taste remained.

A slight cheddar cheese whey odor was still found to persist with the following formulation: 1 gallon of cheddar cheese whey maintained at 90° F., to which was added in the following order; 15 ml. of dilute hydrochloric acid; 10 gm. of carboxymethylcellulose, with 4 gm. of calcium hydroxide being added when a temperature of 120° F. was reached, followed by 20 ml. of sodium silicate solution, with the heating being concluded at 130° F. Fair precipitation was observed.

Instant decanting was still observed when the blandness imparting agent was added. More particularly, a bland whey end product exhibiting instant decanting was prepared in an apparatus in accordance with Example 1 by adding in the following order: 1 gallon cheddar cheese whey 90° F. and a pH of 6.2; 20 ml. of iron gluconate-glycine solution; 20 ml. of copper gluconate-glycine solution; 2 gm. of calcium hydroxide; 20 ml. of sodium silicate solution; and 2.5 gm. of carboxymethylcellulose, the heating being stopped at 130° F., and the final product having a pH of 7.2.

Another formulation was prepared which was lower than the isoelectric point of the whey proteins present. This formulation which did not decant instantly, was as follows: 1 gallon of cheddar cheese whey maintained at 90° F. was placed in the apparatus of Example 1, followed by: 15 ml. of dilute hydrochloric acid; 10 ml. of hydrogen peroxide; 10 gm. of carboxymethylcellulose; 20 ml. of iron gluconate-glycine solution; 20 ml. of copper gluconate-glycine solution; 3 gm. of calcium hydroxide; and 30 ml. of silicate solution. Heating was terminated when 130° F. was reached, and the formulation was found to have a pH of 6.0.

EXAMPLE 7

Cottage cheese whey samples were processed using the basic procedure and process of Example 1, the process steps being essentially repeated, except that the sodium silicate solution was omitted. Analyses were made on the Enzymax analyzer, and these results are reported in Table I, wherein sample 1 refers to the raw whey source that had been subjected to no treatment, sample 2 refers to the liquids fraction of the decanted product formed generally in accordance with Example 1, sample 3 is the floc of that decanted material, and sample 4 is the product from which the silicate floc initiator has been omitted.

TABLE I

|  | SAMPLE | | | |
| --- | --- | --- | --- | --- |
|  | 1 | 2 | 3 | 4 |
| Lactose (wt. %) | 3.8 | 4.0 | 3.8 | 4.0 |
| Glucose (wt. %) | Less than 0.1 | 1.5 | 0.3 | 1.6 |
| pH | 4.2 | 8.5 | 9.5 | 5.8 |
| Temperature | 65° F. | 64° F. | 60° F. | 63° F. |
| Ash* | — | 90 | 220 | — |
| Standard Plate Count Per Ml | 21,000,000 | 1,000 | 1,000 | 2,000 |

*Alkalinity of ash as mls. 0.1N HCl per 100 gm.

EXAMPLE 8

A series of tests were run on cottage cheese whey to test the floc formation differences observed when varying the additives in accordance with this invention. The formulations were prepared generally in accordance with Example 1. In one formulation, decanting was observed in about 1 minute when the colloid enhancer was omitted, the formulation being: 1 gallon of cottage cheese whey at a pH of 4.5; 20 ml. of each of iron and copper gluconate-glycine solutions; 40 ml. of sodium silicate solution; 5 ml. of hydrogen peroxide (30%); and 2 gm. of calcium hydroxide dissolved within 40 ml. of whey decanted liquor, which formulation had been heated up to 150° F., the pH being 6.6. When the peroxide was omitted, a very fast decanting was still observed, but the pH was at about 10. When both the peroxide and the gluconate-glycine solution were omitted, the decanting was very slow.

EXAMPLES 9-22

Various tests were run using cottage cheese whey that was maintained within a temperature range no lower than about 120° to 122° F. In each instance, the heating was terminated when a temperature of approximately 132° F. was reached. Results are reported in Table II, wherein the following definitions apply: Gluconate refers to the 1:1 molar solution of metal gluconate and glycine mentioned more particularly in Example 1, the metal being specified in the table; Colloidal Enhancers is one of sodium carboxylmethylcellulose (CMC), locust bean gum (LBG) or a mixture of karaya and guar gum (K&G); Defoamer is a 100% silicone food grade defoamer; Oxidizer is either hydrogen peroxide or ozone developed in an ozonator and bubbled through the blends for the specified number of minutes; Silicate Solution is a sodium silicate solution, and the pH given is the pH after all of the components have been added and blended. One of these preparations to which sodium silicate solution had been added was subjected to analysis of its floc fraction and its liquids fraction. WARF method G.C. #102 having a detection limit of 0.05% detected no glucose, fructose or sucrose, but did detect 4.06 and 4.34% lactose and 0.07 and 0.10% maltose in the floc and liquids, respectively. Additional analyses detected or calculated: 1.2% protein, 89.4% moisture, 3.4% ash, 0.2% fat, less than 0.1% fiber, 5.8% carbohydrates and 29.8 calories/100 gm. for the floc; and 0.7% protein, 93.3% moisture, 0.9% ash, less than 0.1% fat, less than 0.1% fiber, 5.1% carbohydrates and 23.2 calories/100 gm. for the liquids fraction.

able ice crystal formation or shrinkage properties during freezer storage.

EXAMPLE 28

The liquid fraction prepared in Example 15 was used to formulate a simple pasteurized orange drink which included an orange flavoring added thereto. Taste properties were acceptable, although the orange drink did lack a citric acid taste characteristic of orange products, which can be brought about by adding citric acid thereto. The drink exhibited a stability and body much fuller than that of orange juice. This product was stored in a household refrigerator for in excess of three months without noticeable spoilage or flavor deterioration.

Another portion of the liquids fraction produced in Example 15 was capped inside a closed bottle and was stored at room temperature for almost three months, at which time the container was opened and it exhibited only a very faint fermented odor somewhat along the lines of a very new wine. No treatment whatsoever such as pasteurization had been conducted upon this material prior to storage.

TABLE II

| EX. | WHEY (GALS.) | GLUCONATE (ML.) | METAL HY-DROXIDE (GM.) | COLLOID EN-HANCER (GM.) | DEFOAMER (DROP) | OXIDIZER | SILICATE SOLUTION (ML.) | pH |
|---|---|---|---|---|---|---|---|---|
| 9 | 1 | 20, Fe<br>20, Cu | 4.5 | 15 (CMC) | 1 | $O_3$ (3 min.) | 50 | 8.0 |
| 10 | 1 | 20, Fe<br>20, Cu | 2.5 | 15 (CMC) | 1 | $O_3$ (3 min.) | 50 | 7.2 |
| 11 | 1 | 20, Fe<br>20, Cu | — | 30 (LBG) | — | $H_2O_2$ (10 ml.) | 40 | 6.4 |
| 12 | 1 | 10, Fe<br>10, Cu | — | 30 (LBG) | 1 | $H_2O_2$ (10 Ml.) | 40 | 6.6 |
| 13 | 1 | 10, Fe<br>10, Cu | — | 30 (LBG) | 1 | $H_2O_2$ (10 ml.) | 50 | 6.8 |
| 14 | 1 | 10, Fe<br>10, Cu | — | 30 (K&G) | 1 | $H_2O_2$ (10 ml.) | 50 | 6.8 |
| 15 | 40 | 200, Fe<br>400, Cu | 320 | 200 (CMC) | 10 ml. | $H_2O_2$ (400 ml.) | 1200 | — |
| 16 | 40 | 200, Fe<br>400, Cu | 320 | 180 (LBG)<br>60 (CMC) | 10 ml. | $H_2O_2$ (200 ml.) | 300 | — |
| 17 | 1 | 10, Fe<br>10, Cu | 9 | 25 (LBG) | 1 | $H_2O_2$ (10 ml.) | 10 | — |
| 18 | 1 | 10, Fe<br>10, Cu | 9 | 25 (LBG) | 1 | $H_2O_2$ (10 ml.) | — | — |
| 19 | 1 | 10, Fe<br>10, Cu | 9 | 30 (K&G) | 1 | $H_2O_2$ (10 ml.) | 10 | — |
| 20 | 1 | 10, Fe<br>10, Cu | 9 | 15 (LBG) | — | $H_2O_2$ (5 ml.) | — | 8.0 |
| 21 | 1 | 10, Fe<br>10, Cu | 9 | 30 (LBG) | — | $H_2O_2$ (5 ml.) | — | 8.0 |
| 22 | 1 | 20, Fe<br>20, Cu | 10.5 | 18.5 (CMC) | — | $H_2O_2$ (10 ml.) | 30 | — |

EXAMPLES 23-26

Formulations on the order of those in Table II were prepared, each including a gluconate blandness imparting agent, a colloid enhancer, and a silicate floc initiator, and each being adjusted to near the isoelectric points of the proteins present. The formulations exhibited rapid and thorough decanting into a liquids fraction and a solids fraction floc, each of which was tested on an Enzymax analyzer for lactose content and glucose content. Analyses results are shown in Table III.

TABLE III

| EXAMPLE | LACTOSE (WT. %) | GLUCOSE (WT. %) |
|---|---|---|
| 23 (liquid fraction) | 2.7 | 1.2 |
| 23 (solids fraction) | 1.8 | 1.8 |
| 24 (liquid fraction) | 1.4 | 1.4 |
| 24 (solids fraction) | 1.3 | 1.5 |
| 25 (liquid fraction) | 2.1 | 1.3 |
| 25 (solids fraction) | 2.0 | 1.3 |
| 26 (liquid fraction) | 4.3 | 1.0 |
| 26 (solids fraction) | 4.3 | 0.7 |

EXAMPLE 27

An ice cream product was made using the flocculated solids fraction produced in Example 15. A customary ice cream formulation was used, including as the dairy ingredient 18 pounds of the solids fraction floc and 70 pounds of whole milk, which formulation analyzes as a 12% butterfat ice cream product. This product was found to have the appearance, taste, and mouth feel of an 18% butterfat ice cream product, was observed to have acceptable sweetness, and did not exhibit undesir-

EXAMPLE 29

A gelatin substitute was prepared from a soy bean based material and a whey based material in combination with a natural gum. A commercial isolated protein (400 grams of Promine D) was dispersed to a heavy paste within 2500 ml. of distilled water, after which it was washed under heavy shear action with hydrochloric acid to a pH of about 4.7 and then filtered. Into this paste was dispersed 20 ml. of a 1:1 molar copper gluconate-glycine solution as well as 20 ml. of 1:1 molar solution of iron gluconate and glycine. Also blended in were 3.5 grams of calcium hydroxide dissolved in 100 ml. of distilled water and 2 grams of the enzyme papain dissolved within 100 ml. of distilled water, followed by 3 ml. of an emulsion of 1.5 ml. of carbon disulfide with 1.5 ml. of a food-grade emulsifier, after which the solution cleared into a bland solution when blending was complete. A buffer of 10 grams sodium citrate dissolved in 100 ml. of water was then added, followed by the addition of 2000 ml. of the liquids fraction prepared generally in accordance with Example 1, this blending being made within the shear imparting apparatus of Example 1. While the shear blending was proceeding, about 50 grams of a blend of 80% Irish moss and 20% guar gum were dispersed therein. Upon standing at room temperature, a clear, gelled product having good mouth feel and thermomeltability was developed.

EXAMPLE 30

Liquid fraction prepared generally in accordance with Example 1 was used to prepare a cloudy, generally beige-colored product. Twenty grams of Stamere N-75, an Irish moss or sugar type seaweed, were added to 200 ml. of liquid fraction and blended therein. The gel was formed by permitting the mixture to stand undisturbed at room temperature.

The preceding Examples are offered to illustrate the present invention; however, they are not intended to limit the general scope of this invention, which is to be construed and limited only by the scope of the appended claims.

I claim:

1. A process for treating whey, comprising:
 subjecting whey to blending shear forces while maintaining heat within said whey to conduct said blending step above a predetermined temperature;
 incorporating a blandness imparting component into said whey during said blending and heat maintaining steps to give the whey a bland odor and taste, said blandness imparting component being a metal gluconate solution; and
 adding a colloid enhancer component to said whey during said blending and heat maintaining steps to impart a colloidal-type condition to said whey.

2. The process of claim 1, further comprising adding a floc initiator component to said bland whey having said colloidal-type condition to automatically separate said whey into a solids fraction floc and a liquid fraction.

3. The process of claim 2, wherein the volume of said solids fraction floc is approximately the same as the volume of said liquids fraction.

4. The process of claim 2, further comprising blending into said liquids fraction a gel inducing component selected from the group consisting of natural mosses and natural gums, and allowing the blend thus formed to set into a substitute gelatin.

5. The process of claim 4, further comprising preparing and blending into said liquids fraction a soy protein extract liquid that has been treated with said blandness imparting component.

6. The process of claim 2, further comprising adding to said solids fraction floc ingredients for completing products selected from the group consisting of ice cream, yogurt, and cream dressings.

7. The process of claim 2, wherein said floc initiator is an alkali metal silicate solution added in a quantity between about 5 and about 60 mls. for each 3.785 liters of said whey.

8. The process of claim 1, further comprising mixing a pH adjusting component into said whey during said blending and heat maintaining steps.

9. The process of claim 8, wherein said pH adjusting component is calcium hydroxide mixed in at a quantity between about 1 and about 15 grams for each 3.785 liters of said whey.

10. The process of claim 1, further comprising incorporating an oxygen source into said whey during said blending step, said oxygen source being selected from the group consisting of ozone bubbles and hydrogen peroxide.

11. The process of claim 1, wherein said heat maintaining predetermined temperature is between about 90° F. and a temperature at which the whey is denatured.

12. The process of claim 1, wherein said heat maintaining step includes heating and wherein said blending step is terminated when the temperature of said whey reaches at least 125° F.

13. The process of claim 1, further comprising adding a drink flavoring component to said whey having said colloidal-type condition.

14. The process of claim 1, further comprising adding skim milk to said whey having said colloidal-type condition.

15. The process of claim 1, wherein said blandness imparting component is incorporated in a total quantity between about 5 and about 60 ml. for each 3.785 liters of said whey.

16. The process of claim 1, wherein said metal gluconate solution is selected from the group consisting of aqueous solutions of iron gluconate and glycine, aqueous solutions of copper gluconate and glycine, and blends thereof.

17. The process of claim 1, wherein said colloidal enhancer is a carboxyalkyl cellulose material added in a quantity between about 2 and about 40 grams for each 3.785 liters of said whey.

18. A food product having a treated whey source prepared by a process comprising:
 subjecting whey to blending shear forces while maintaining heat within said whey to conduct said blending step above a predetermined temperature;
 incorporating a blandness imparting component into said whey during said blending and heat maintaining steps to give the whey a bland odor and taste, said blandness imparting component including a metal gluconate; and
 adding a colloid enhancer component to said whey during said blending and heat maintaining steps to impart a colloidal-type condition to said whey,
 the treated whey including said metal gluconate.

19. The food product of claim 18, wherein said product is a protein drink having a flavoring component blended thereinto.

20. The food product of claim 18, wherein said product is a drink including approximately equal quantities of skim milk and of said whey having said colloidal-type condition.

21. The food product of claim 18, wherein said product is selected from the group consisting of ice cream, yogurt, and cream dressings, said product including a solids fraction floc that was automatically decanted from a liquids fraction, both of said fractions having been formed by adding a floc initiator component to said whey having said colloidal-type condition.

22. The food product of claim 18, wherein said product is a gelatin settable at ambient temperature, said product including a liquids fraction that was self-decanted from a solids fraction floc, both of said fractions having been formed by adding a floc initiator component to said whey having said colloidal-type condition, and said product further including a gel inducing component selected from the group consisting of natural mosses and natural gums.

23. A food product having a treated whey source prepared by a process comprising:
  subjecting whey to blending shear forces while maintaining heat within said whey to conduct said blending step above a predetermined temperature;
  incorporating a blandness imparting component into said whey during said blending and heat maintaining steps to give the whey a bland odor and taste; and
  adding a colloid enhancer component to said whey during said blending and heat maintaining steps to impart a colloidal-type condition to said whey,
  wherein said product is a gelatin settable at ambient temperature, said product including a liquids fraction that was self-decanted from a solids fraction floc, both of said fractions having been formed by adding a flow initiator component to said whey having said colloidal-type condition, said product further including a gel inducing component selected from the group consisting of natural mosses and natural gums,
  wherein said product further includes therewithin a soy protein extract liquid that has been treated with said blandness imparting component.

* * * * *

UNITED STATES PATENT AND TRADEMARK OFFICE
CERTIFICATE OF CORRECTION

PATENT NO. : 4,235,937
DATED : November 25, 1980
INVENTOR(S) : Robert K. Remer

It is certified that error appears in the above-identified patent and that said Letters Patent are hereby corrected as shown below:

Column 1, line 23, after "liquid" should be --themselves--.

Column 2, line 34, "typicallyhas" should be --typically has--.

Column 7, line 42, "whereby" should be --thereby--.

Column 16, line 8, "flow" should be --floc--.

Signed and Sealed this

Twelfth Day of May 1981

[SEAL]

Attest:

RENE D. TEGTMEYER

*Attesting Officer*     *Acting Commissioner of Patents and Trademarks*